United States Patent [19]

Awalt, Jr.

[11] 4,143,705
[45] Mar. 13, 1979

[54] STORAGE FOR HEAT AND COLD

[76] Inventor: Thomas Y. Awalt, Jr., P.O. Box 1053, Pensacola, Fla. 32595

[21] Appl. No.: 820,738

[22] Filed: Aug. 1, 1977

Related U.S. Application Data

[63] Continuation-in-part of Ser. No. 540,866, Jan. 14, 1975, and a continuation-in-part of Ser. No. 791,848, Apr. 28, 1977.

[51] Int. Cl.$^2$ .............................................. F24J 3/02
[52] U.S. Cl. ..................................... 165/18; 126/400; 237/1 A
[58] Field of Search ............. 126/400; 237/1 A; 62/2, 62/238; 165/45, 18

[56] References Cited

U.S. PATENT DOCUMENTS

| | | | |
|---|---|---|---|
| 3,812,903 | 5/1974 | Thomason | 126/400 X |
| 3,952,947 | 4/1976 | Saunders | 237/1 A |
| 3,996,759 | 12/1976 | Meckler | 62/2 |
| 4,007,776 | 2/1977 | Alkasab | 62/2 X |
| 4,012,920 | 3/1977 | Kirschbaum | 62/2 |
| 4,015,962 | 4/1977 | Tompkins | 237/1 A X |
| 4,024,908 | 5/1977 | Meckler | 165/18 |

Primary Examiner—William E. Wayner
Assistant Examiner—William E. Tapolcai, Jr.

[57] ABSTRACT

Heat storage and/or cold storage are essential to effective utilization of solar energy sources, including sun and wind. Efficient auxiliary controlled heat sources are also desirable, if not essential. This invention provides a liquid heat and/or cold storage unit in radiant heat transfer relationship with the living space of a shelter for use with weather-sensitive energy sources or weather-sensitive energy harnessing mechanisms, and it includes an optional controlled heating source within the liquid storage space. Maximum heat and/or cold utilization is insured with minimal losses through transmission of heat outside living spaces. The heat storage unit may be heated or cooled and heat may be provided or withdrawn from the living space via radiation as well as convection and controlled by means of removable insulation in the form of sliding or folding doors or panels and the like. One or more of these units may be employed as a liquid alternately hot and cold storage subsystem in combination with a second isolated hot storage subsystem so as to provide a combined hot storage system for cold weather operation and a split hot-cold storage system for hot weather operation.

4 Claims, 3 Drawing Figures

STORAGE FOR HEAT AND COLD

This is a continuation-in-part of my co-pending U.S. Pat. Applications, Ser. No. 540866, filed Jan. 14, 1975, and Ser. No. 791848, filed Apr. 28, 1977.

BACKGROUND OF THE INVENTION

With energy declining and energy demands rising, the need for heating and cooling systems independent or nearly independent of central electrical power sources becomes ever-increasing. Heretofore, some success has been obtained with solar heat; but a major disadvantage in solar heating systems for shelters is that demands for heat and/or cold in the shelter is the heaviest when the supply of solar energy is at it's natural ebb. Heat from the sun must be stored for use when the sun is not shining. Wind, as a source of energy cannot be depended upon as a source of heat during periods of calm. The wind and sun are indeed weather-sensitive energy sources. A source of energy which is not weather sensitive may become weather-sensitive to a certain extent, by the harnessing means employed. For example, an evaporator-condensor system which takes heat from the outside atmosphere, releasing it into the shelter, will operate more efficiently during the day when the outside temperature is much lower.

Convenience controlled non-weather-sensitive heat sources are not always available on a constant basis. For example, a fireplace may be conveniently operated for only three hours during most evenings. An oven may operate for another two hours. An incinerator for disposal of trash or garbage, may operate for yet another hour. Ultimately, all or most of these readily available "controlled" heat sources should be fully utilized in home air conditioning systems without significant loss of heat to the outside atmosphere or into the ground through complicated heat transmission systems; and it is desirable, if not essential, to maximize the efficiency of these controlled heat sources and to eliminate unnecessary transmission lines, fans, pumps, coils and the like.

To permit continuity of air conditioning, therefore, through periods of low energy-producing weather and inconvenient controlled heat operation, weather-sensitive sources and convenience-controlled non weather-sensitive sources should have a heat and/or cold storage facility. This facility, in order to provide maximum efficiency should be integrated as closely as possible with the means of producing the heat or cold and the living space in which the heat or cold will be ultimately employed. The more fully the integration is accomplished, the more practical and efficient will be the system, because a fully integrated system inevitably eliminates losses of heat storage and transmission losses and the inevitable expense and probable power drain involved in heat transmission. A direct heat transfer relationship, for example, between a fireplace and the heat storage medium and between the heat storage medium and the living space would logically provide the most efficient system for using the fireplace for heating during periods in which it is inconvenient to tend a fire. While it may not be possible to fully integrate solar heat collecting units with the heat storage facility, it may yet be possible to integrate by direct heat transfer the heat storage facility with the living space.

A separate but overlapping consideration is that while the best of integrated systems may involve several heat sources at least some of which depend upon pumps, fans, etc., requiring constant energy sources, it is most desirable that efficient home heating be at least minimally operable in the absence of outside central electrical power sources, and during weather negating periods in which the sun is not shining or the wind is not blowing.

The teachings of the prior art have not fully utilized the principal of integration as it applies to the particular circumstances of the home in heat and cold storage systems.

U.S. Pat. No. 3,812,903, for example, features a hot or cold storage system in which the hot or cold storage means is outside the living space, and air may be blown through a rock pile around a tank of liquid, thereby to absorb or release heat from or into the storage space before being circulated into the living space or back through a furnace or refrigeration coil. A disadvantage of this system is that since radiant heat transfer is not provided, its operation depends upon a blower. Another disadvantage is there are inevitable losses of heat or cold into the bottom and the sides of the heat storage pit. Yet another disadvantage of the system is that efficient means are not provided for utilizing available controlled heat sources such as fireplaces, incinerators, ovens and the like.

In recent years, fireplaces have been improved to some extent in efficiency as an immediate source of heat. Warm air circulation systems have been provided whereby a large measure of the heat potential is circulated to the living space of a shelter. Further improvements in fireplace efficiency have not been sought because without heat storage facilities, additional heat served no useful purpose. Present day heat storage facilities do not lend themselves to the utilization of this major home controlled heat source, nor has it been proposed to store such heat.

There also has been a need for integrating other common household heat sources into a central heating and air conditioning system.

Other qualities lacking in heat and cold storage facilities of the prior art include immediate utilization and cut-off. Many households are inhabited intermittently with families at work or in school during working hours of the day. For the ultimate in conservation, a heating system should be immediately responsive to heat requirements, and a cut-off should be immediately effective. Delayed resonse, characteristic of most present day heating and cooling systems, is not conducive to cut-off during periods of non-use. Radiant heat is immediately effective, and a heat storage unit placed in direct radiant heat transfer relationship with the living space would have immediate effect. When the radiant heat transfer relationship is terminated, heat loss from the heat storage unit would cease without transmission line loss.

All of the above considerations would indicate that a liquid storage system should be located in direct heat transfer relationship with the living space; but there are other considerations which must be accounted for in the design of a practical solar or weather-sensitive system. According to the present state of the art, the most practical method of air conditioning using solar heat is the absorption chiller, which, as is well known in the art comprises a lithium bromide absorber/condenser, a generator and an evaporator. Hot water is fed into the generator causing evaporation with resulting cooling. In order to employ such an air conditioning system it is necessary to have a supply of hot liquid. Of course the hot liquid supply in a solar system may come directly from the solar collectors; but if no storage capacity of hot (liquid) or of cold (liquid) is provided, there would be no carryover capacity from afternoon until morning or during other periods in which the solar collectors were not collecting heat. A system is needed, therefore, in which an integration of the needs of both summer and winter heating is provided.

A substantial difference in the requirements between the amount of storage needed for summer and winter operation of a heating system should be noted. Cold weather operation requires the maximum carryover capacity, (e.g., maximum heat storage), but not necessarily the highest possible temperature of the liquid in storage. Hot weather operation, on the other hand, requires liquid in storage at a higher temperature (in order to operate present day absorption chillers) but not, ordinarily, more of such liquid than is needed to carry over from one day to the next, that is to say, through the night. An ideal system would be provided for a long winter carryover with high versatility, and a much shorter summer carryover capacity, but at higher temperatures.

Prior art heat storage units, not designed for use in combination with solar systems have provided for control of heat transfer between storage and the living space, with removable insulation as in U.S. Pat. No. 2,066,127 but such devices were without recognition of or means for full adjustment of the storage-to-living space heat transfer independent of the controlled heat source for heating to storage medium.

For example, if the doors were opened most of the controlled heat, if in operation, was directed to the living space, this being inconsistent with an object of the instant invention to permit massive low temperature radiant heat transfer even where controlled (high temperature) heat is applied to the liquid storage medium. This means that in effect there would be a substantial loss (through regulation of overall heat emission) of massive low temperature radiant heat transfer from heat storage to living space while employing the controlled heat source. During this period of employment of controlled heat there would exist the uneconomical concentration of high temperature emission along with the necessity of shifting the adjustment of insulation whenever the need existed for use of the controlled heat source. Conversely where an open fireplace is employed as the controlled heat source it would sometimes be desirable in a solar system to use all of the direct radiant heat of the fireplace for its cheery effect but to conserve a substantial portion of the amount of the heat in storage whenever practical to do so.

BRIEF DESCRIPTION OF THE INVENTION

One aspect of this invention is the combination with a shelter having exterior walls and a living space of an air conditioning system comprised of at least one weather-sensitive harnessing means, and provisions for heat storage. The provisions for heat storage include a liquid first alternately hot and cold storage sub-system comprising at least one interior container having insulated walls, a substantial portion thereof being in potential direct radiant heat transfer relationship with the living space, having adjustably regulated removable insulation shielding between the container and the living space. Provisions for heat storage also include a second hot liquid storage sub-system comprising at least one container permanently insulation shielded and isolated from the living space. The weather sensitive energy harnessing means may include means for cooling the liquid as in the case of a conventional heat pump, or a separate means for cooling the liquid may be employed. Such as, for example, a lithium bromide absorption chiller, or any other chiller deriving the energy for chilling the liquid, in part at least, from the hot water collected in a solar system. Means are provided for separating the first and the second storage subsystems into cold and hot storage subsystems respectively for hot weather operation, and alternately for employing the first and the second subsystems concomittively as hot storage subsystems for cold weather operation. Preferably the first alternately hot and cold subsystem, including one or any plurality of container, provides a minimal temperature differential heat storage in the sense that sufficient storage is provided to permit, through massive heat transfer surfaces, comfortable heating of the living space at a minimum temperature differential between the heat storage temperature and the temperature of the living space. Preferably such containers provide for massive radiant heat transfer in addition to convective heat transfer.

In one specific embodiment of this invention is provided a low temperature differential heat storage and radiant heat transfer unit which fits removably and conveniently into the wall structure of a shelter, preferably an interior wall, so that excessive floor space is not thereby depleted. All or most of the unit is shielded from the living or wall space with insulation. At least one major heat transfer surface of the storage unit is substantially removably adjustably insulation shielded so that the amount of heat transfer into or out of the storage unit may be controlled without interfering with maximum heat transfer between the controlled heating means for the liquid and the liquid in storage. A controlled heating means such as an electric resistance heater may or may not be incorporated into the heat storage unit.

In the detailed description, reference will be made to the Drawing in which:

FIG. 1 is a perspective of a low temperature differential heat storage and radiant heat transfer unit suitable for use in the system of this invention;

FIG. 2 is a schematic of the split system described above in which the first liquid alternately hot and cold storage subsystem comprises two radiant storage containers with parallel feed and return, mounted so as to provide additional heating and cooling effect to that of a hot/cold air system; and FIG. 3 is a schematic in which the first liquid alternately cold and hot subsystem also comprises two containers, the subsystem here being mounted in such a manner as to provide a constant temperature input to a supplemental warm air system.

DEFINITIONS

By weather-sensitive energy harnessing means is meant any energy harnessing means for heating and cooling wherein, because of the source of energy, or the method of collecting the energy, weather becomes a substantial factor. The weather sensitivity of solar heat collectors and windmills, for example, is readily apparent and the energy source, itself, may be classified as weather-sensitive. Certain energy harnessing systems also have substantial inherent weather sensitivity, as for example, evaporator condensor systems in which heat is removed from the living space and discharged into the ambient atmosphere, as in present day conventional air conditioning systems, which function much more efficiently during cooler night hours than during the warmer daytime hours. Some conventional evaporator-condensor systems remove heat from the outside ambient atmosphere and release heat in the living space. These systems are even more weather sensitive because their efficiency dwindles to a very low percentage at about 20 degrees fahrenheit. Such systems, in most climates, can be made to operate much more efficiently during the warmer daytime hours than during the cooler nights.

By controlled heating means or heat source is meant any means for obtaining or source of heat or cold which may be set in operation regardless of the weather, and therefore in not entirely dependent upon the sun or the wind. A controlled heating means may be weather-sensitive nor non weather-sensitive. A convenience controlled heat source is one which is conveniently employed only during limited periods.

By air conditioning system is meant any system for conditioning air for temperature and/or humidity by means of heating or cooling.

By direct heat transfer relationship is meant that heat or cold is passed directly from one medium or its container wall to another medium without the necessity of any intermediate transmission means. A combustion chamber surrounded by water is in direct heat transfer relationship with the water. Such relationship may be entirely radiant or it may involve convection conduction as well.

DETAILED DESCRIPTION OF PREFERRED EMBODIMENTS

Figure 1:
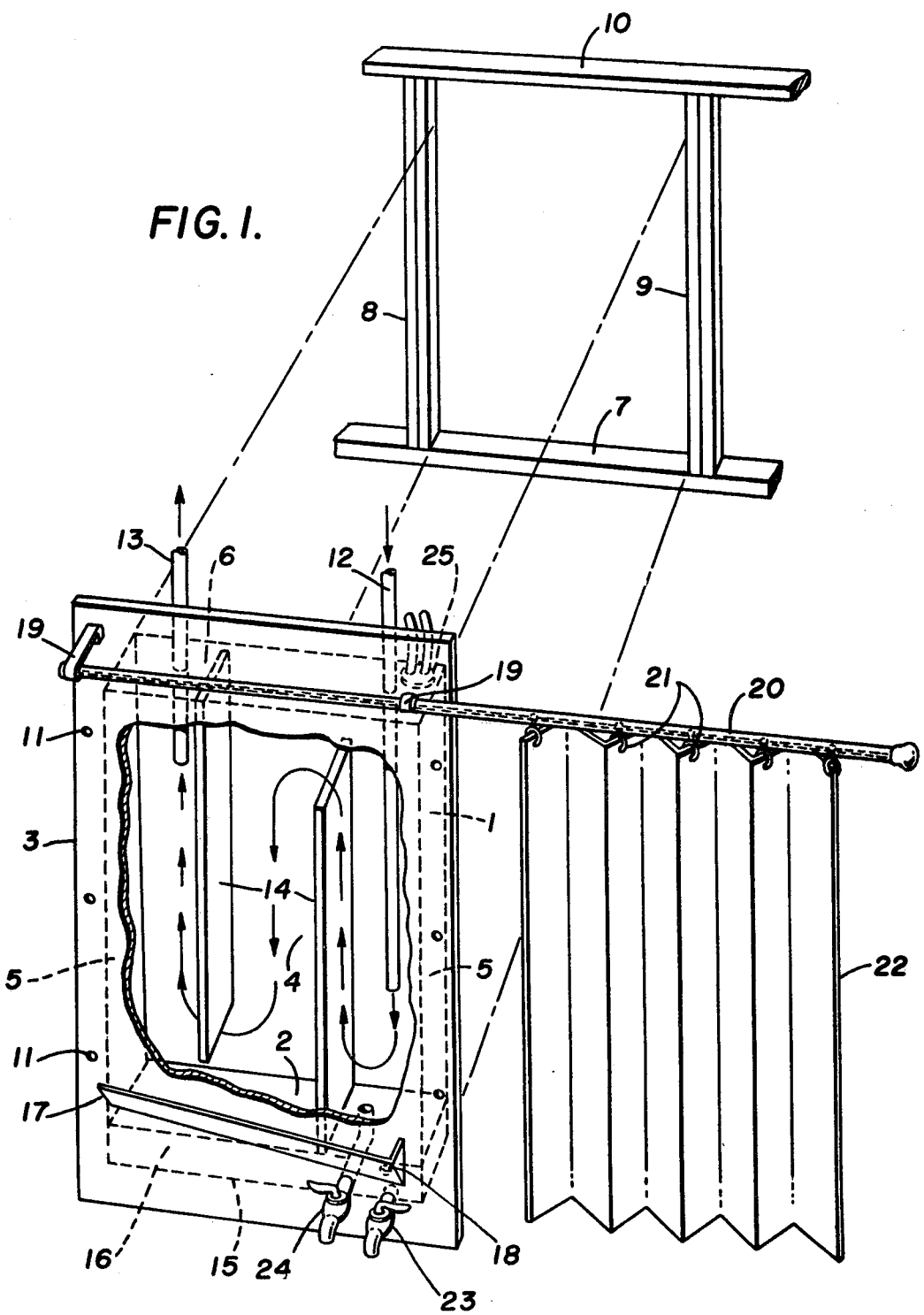
Figure 2:
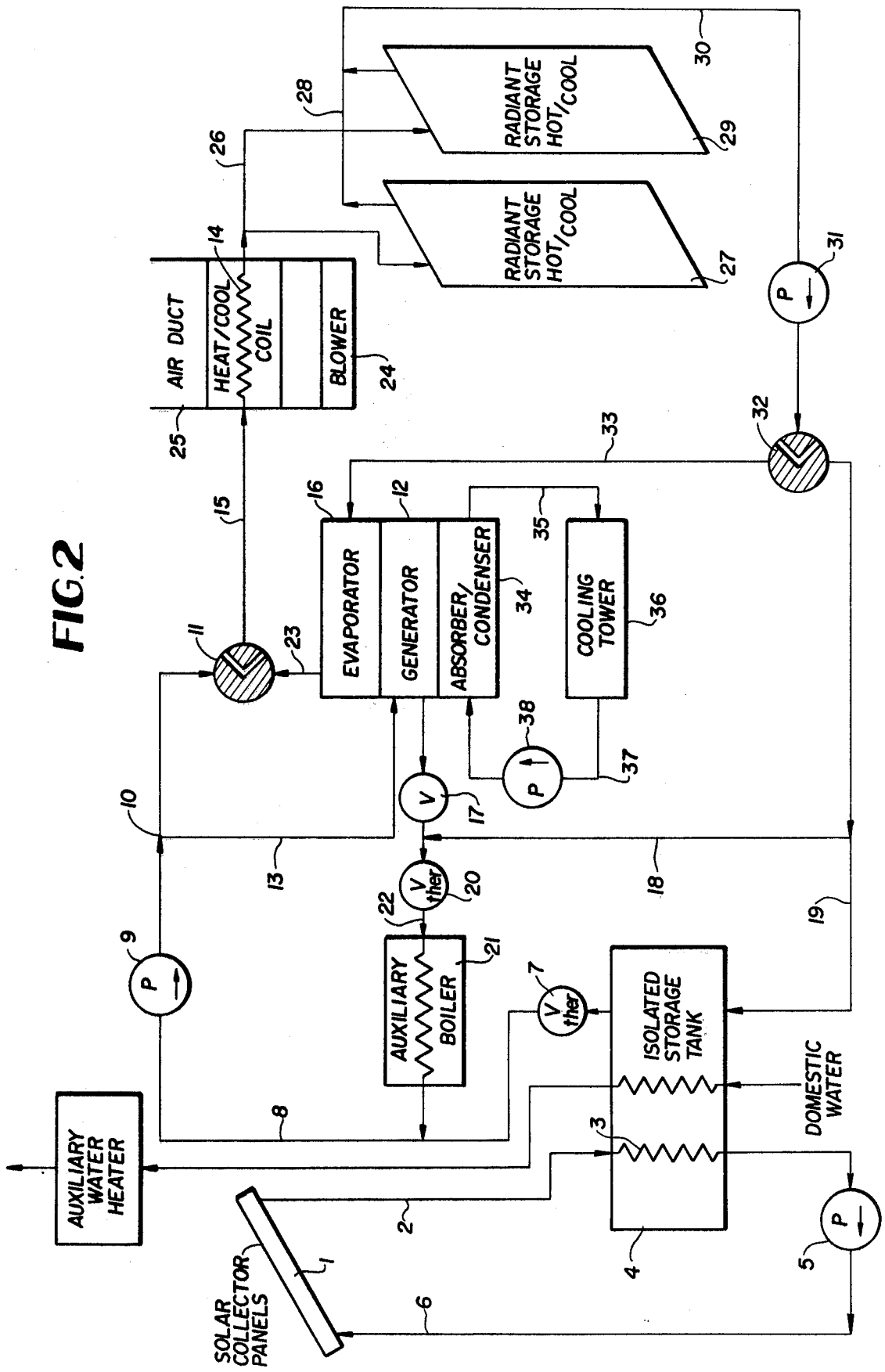
Figure 3:
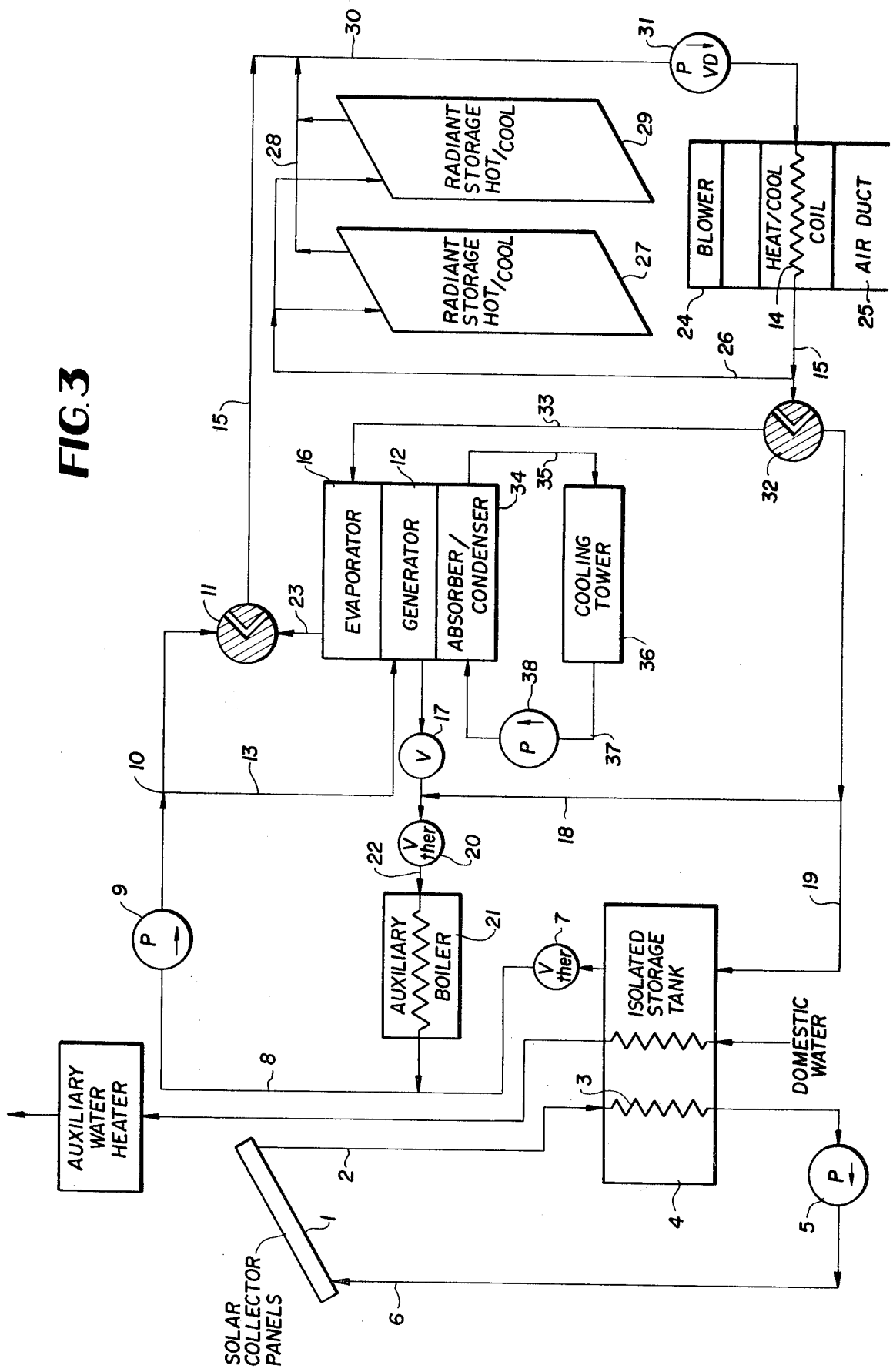

Referring to FIG. 1, heat storage unit 1 comprises base 2, adjustable radiant heat transfer wall 3, insulated back wall 4, insulated ends 5 and insulated top 6. Heat transfer wall 3 extends beyond the remainder of unit 1 in all directions so as to provide an installed overlap at the bottom over sole 7, along the sides to cover at least a portion of twin studs 8 and 9, and along the top side so as to cover the space between top 6 and plate 10, and to overlap plate 10, the space between top 6 and plate 10 to provide room for passage of wiring and plumbing laterally through the wall. Wall 3 is fastened to studs 8 and 9 through stud fastening holes 11. Unit 1 is provided with liquid inlet means 12 and liquid outlet means 13 which are connected directly or indirectly with a weather-sensitive energy harnessing means. Vertical disposed baffles 14 provide channeling means for the liquid between inlet means 12 and outlet means 13, and strengthening means between wall 3 and back wall 4. Below liquid storage base 2 and contiguous with walls 3 and 4 and ends 5 is a condensation collection base 15, comprising, in conjunction with walls 3 and 4 and ends 5, condensation collection tank 16, into which condensation on wall 3 is channeled by condensation channel 17 and lipped aperture 18. Rod brackets 19 are affixed to wall 3 to support shielding rod 20 on which hangers 21, slideably supporting flexible insulation shielding 22, are mounted. Condensation collection may be drained by valve 23. Storage unit 1 may or may not be provided with a controlled heat source such an electric resistance heater 25. When installed in an interior wall at a location where it is desirable to use both sides (3 and 4) for heat transfer purposes, back wall 4 would also be equipped with brackets, shielding rod, curtain hangers and removably adjustable (as opposed to fixed) insulation shielding as well as a condensation channel and lipped aperture 18. An appropriate trim plate (not show), would also be provided for back wall 4 to cover the gap between top 6 and plate 10, and the crack between the ends and base of the tank and the adjacent studs 8 and 9 and lower plate 7. It will be noted that when unit 1 is affixed to studs 8 and 9, it will not be load bearing, but it will provide lateral stability to the wall, and it will be easily removable for repair or replacement. The operation of the embodiment of FIG. 1 and examples of its relationship with other components of the combination is shown at FIGS. 2 and 3. Referring now in detail to FIG. 2, liquid in solar collector panels 1 is heated by the sun and transferred via conduit 2 to coil 3 in isolated storage tank 4, where heat transfer takes place between the liquid in coil 3 and the liquid in tank 4. Pump 5 returns the liquid to solar collector panels 1 via conduit 6. The liquid in isolated storage tank 4 is conducted through variable thermostat 7 along conduit 8 through pump 9 to conduit junction 10, at which point, depending upon the position of two-way valve 11, the hot liquid will be passed to generator 12 via conduit 13 or coil 14 via conduit 15. In the cooling mode, two-way valve 11, being in the evaporator 16-coil 14 position, will cause the hot liquid to pass from storage tank 4 to generator 12 and return to tank 4 via valve 17 and conduit 18 and 19. Should the temperature of the liquid in isolated storage tank 4 be insufficient to run generator 12, thermostatic valve 7 will close and thermostatic valve 20 will open so that the liquid may be passed to auxiliary boiler 21 via conduit 22, thereafter to optional conduit 8 to complete the cycle using liquid heated in the auxiliary boiler. Chilled water emerging from evaporator 16 passes through conduit 23 to two-way valve 11 and through conduit 15 to coil 14, whereupon, in conjunction with optional blower 24, optional air duct 25 may be cooled. The cooled liquid passes through coil 14 to conduit 26 to alternate radiant storage tanks 27 and 29, both alternate radiant storage tanks being constructed as shown in FIG. 1. The now warmer cool liquid passes through conduits 28 and 30 and pump 31 to two-way valve 32 where it is directed to evaporator 16 through conduit 33. Also in the cooling mood, absorber/condenser 34 is in operation, giving off heated water via conduit 35 which is in turn cooled in cooling tower 36 and returned to absorber/condenser 34 via conduit 37, the cycle being maintained by pump 38. In the heating mode, evaporator 16, generator 12, and absorber-condenser 34 are not in operation, nor is cooling tower 36. Two-way valve 11 is directed to pass the hot water from conduit 8 through conduit 15, coil 14, conduit 26, alternate radiant storage tanks 27 and 29, conduits 28 and 30, pump 31, which need not be in operation in in this phase, and through two-way valve 32 which directs the flow to conduit 19 back to isolated storage tank 4 via conduit 19. As in the cooling mode, auxiliary boiler 21 may be used to supply heat and liquid when the temperature of the liquid in isolated storage tank 4 is too low. Evaporator 16, generator 12, and absorber/condenser 34 are components of a conventional lithium bromide absorption chiller.

Referring now in detail to FIG. 3, all components are the same as FIG. 2, and operation identical except that alternate radiant storage tanks 27 and 29 are in parallel rather than in series with coil 14, which permits coil 14 to operate under a variable displacement pump 31 so as to provide heat as needed. When heat required for coil 14 is in excess of that furnished by pump 9, liquid in storage in alternate radiant storage tanks 27 and 29 will be drawn to furnish the difference. Where less than that furnished by pump 9 is required, a storage supply will be built up in alternate radiant storage tanks 27 and 29. In the cooling mode, the amount of liquid which passes through evaporator 16 is controlled at design volume by the apparatus appurtenant to the evaporator, and it is with respect to this current that the variable displacement pump 31 will co-act to create more storage of cooled liquid or to withdraw from the storage of cooled liquid in alternate radiant storage tanks 27 and 29.

Component flexibility is a major characteristic of this invention and it will be appreciated that various heating and/or cooling components may be employed within the spirit of this invention depending upon individual requirements, weather conditions, and the state of the art and development of new components. Radiant storage tanks 27 and 29 may, of course, be employed in series as well as in parallel to provide a less uniform distribution of heating or cooling. The air cooling shown in the drawing may be eliminated entirely if sufficient distribution of heat may be obtained by use of radiant panels.

It will also be appreciated that various shielding means may be employed to control and adjust the direct heat transfer relationship between the living space and the walls of the heat storage unit to include, for example, insulative drapes, doors, panels, moveable walls, fluid dispersants, and the like, and that these shielding means may be automatically or manually operated. Automatic shielding means may, of course, be thermostatically controlled.

It will also be readily understood by those skilled in the art that the combination of this invention may be employed in other types of presently known conventional systems which are designed to maintain design chilled liquid temperature flow for use with (and to supplement) well known liquid to air cooling systems.

Wherever the liquid in a system is referred to herein, as if to imply that the same liquid is in circulation throughout, it should be understood to include discontinuous systems wherein, for convenience, liquid to liquid heat transfer is employed. For example, as shown in FIGS. 2 and 3, it may be desirable to isolate the liquid in solar collectors from the liquid in storage so that antifreeze and anti-corrosive materials may be used in the collector and not in the storage system. The liquid in the solar collectors will not then be continuous with the liquid in storage.

Other applications of this combination described herein will be readily apparent to those skilled in the art.

I claim:

1. The combination with a shelter having a living space of an air-conditioning system comprising:
    (1) at least one weather-sensitive energy harnessing means including means for producing a hot liquid:
    (2) a liquid first alternately hot and cold storage subsystem comprising at least one container interior to the living space having insulated walls, a substantial portion thereof being in potentially direct radiant heat transfer relationship with the living space, having adjustably regulated removable insulation shielding between the container and the living space:
    (3) a second hot liquid storage sub-system comprising at least one container permanently insulation shielded and isolated from the living space:
    (4) means for producing a cool liquid:
    (5) interconnecting liquid transmission and return means between (1) and (3), (3) and (2), and (4) and (2), including valve control means for separating the first and second heat storage sub-systems into cold and hot storage sub-systems respectively for hot weather cooling operation, and alternately for employing said first and second sub-systems concomitantly as hot storage sub-systems for cold weather operation.

2. The combination of claim 1 wherein means (4) for producing a cool liquid employs energy furnished from means (1) in the form of hot liquid.

3. The combination of claim 2 wherein means (4) is a lithium bromide absorption chiller.

4. The combination of claim 1 wherein means (4) for producing a cool liquid is a part of weather-sensitive energy harnessing means (1).

* * * * *